US011275223B1

(12) United States Patent
Lin et al.

(10) Patent No.: US 11,275,223 B1
(45) Date of Patent: Mar. 15, 2022

(54) OPTICAL TRANSCEIVER

(71) Applicant: Prime World International Holdings Ltd., New Taipei (TW)

(72) Inventors: Jhen Lin, New Taipei (TW); Hsuan-Chen Shiu, New Taipei (TW); Che-Shou Yeh, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 17/012,727

(22) Filed: Sep. 4, 2020

(51) Int. Cl.
*H04B 10/00* (2013.01)
*G02B 6/42* (2006.01)
*H04B 10/40* (2013.01)

(52) U.S. Cl.
CPC ......... *G02B 6/4269* (2013.01); *G02B 6/4246* (2013.01); *G02B 6/4272* (2013.01); *H04B 10/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,274,687 B1* | 4/2019 | Shi | ...................... | G02B 6/4243 |
| 2009/0269077 A1* | 10/2009 | Sone | ...................... | H04B 10/40 |
| | | | | 398/135 |
| 2012/0251057 A1* | 10/2012 | Yi | ...................... | G02B 6/4269 |
| | | | | 385/92 |
| 2015/0104177 A1* | 4/2015 | Kato | ...................... | G02B 6/4246 |
| | | | | 398/79 |
| 2017/0261711 A1* | 9/2017 | Chiang | ................ | G02B 6/4267 |
| 2017/0317763 A1* | 11/2017 | Sunaga | .................. | H04B 10/40 |
| 2017/0336583 A1* | 11/2017 | Chen | ...................... | H04B 10/40 |
| 2018/0131448 A1* | 5/2018 | Yagisawa | ............. | H04B 10/801 |
| 2019/0146167 A1* | 5/2019 | Leigh | ................... | G02B 6/4278 |
| | | | | 361/715 |
| 2019/0174654 A1* | 6/2019 | Zhang | ................ | H05K 7/20145 |
| 2019/0271818 A1* | 9/2019 | Cabessa | ................. | G02B 6/428 |
| 2019/0281691 A1* | 9/2019 | Matsui | ................ | G02B 6/4268 |
| 2019/0312645 A1* | 10/2019 | Ishii | ........................ | H04J 14/04 |
| 2020/0100391 A1* | 3/2020 | Oki | ...................... | G02B 6/4272 |
| 2020/0112373 A1* | 4/2020 | Lai | ....................... | G02B 6/4269 |
| 2020/0144151 A1* | 5/2020 | Bettman | ................. | H01L 23/13 |
| 2020/0195350 A1* | 6/2020 | Matsui | ................ | G02B 6/4281 |
| 2020/0285006 A1* | 9/2020 | Matsui | ................ | G02B 6/4261 |
| 2020/0292769 A1* | 9/2020 | Zbinden | .............. | G02B 6/4269 |
| 2020/0326494 A1* | 10/2020 | Ishii | ..................... | G02B 6/4246 |
| 2020/0333543 A1* | 10/2020 | Oki | ...................... | G02B 6/4268 |
| 2021/0013694 A1* | 1/2021 | Masuyama | ......... | H01S 5/02345 |
| 2021/0103108 A1* | 4/2021 | Wall, Jr. | ................. | H04B 10/40 |

(Continued)

*Primary Examiner* — Agustin Bello
(74) *Attorney, Agent, or Firm* — Grossman Tucker Perreault & Pfleger, PLLC

(57) ABSTRACT

An optical transceiver includes a housing, a heat dissipation module and an optical communication module. The heat dissipation module includes a first heat conductive component and a second heat conductive component accommodated in the housing. The first heat conductive component and the second heat conductive component are two independent components, and the first heat conductive component thermally contacts the second heat conductive component. The optical communication module is accommodated in the housing and thermally contacts the heat dissipation module.

9 Claims, 6 Drawing Sheets

(56) References Cited

U.S. PATENT DOCUMENTS

2021/0105025 A1* 4/2021 Wall, Jr. ............... G02B 6/4269
2021/0176874 A1* 6/2021 Ishii .................... H05K 5/0026
2021/0223490 A1* 7/2021 Matsui .................. H04B 10/40

* cited by examiner

OPTICAL TRANSCEIVER

BACKGROUND

Technical Field

The present disclosure relates to optical communication, more particularly to an optical transceiver.

Related Art

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different form factors such as XFP (10 Gigabit Small Form Factor Pluggable) used in 10 GB/s communication rate, QSFP (Quad Small Form-factor Pluggable), or others at different communication rates have been made available.

As to the optical components in a conventional optical transceiver, a circuit board is disposed in a housing, and a TOSA (Transmitter optical sub-assembly) as well as a ROSA (Receiver optical sub-assembly) are mounted on the circuit board.

SUMMARY

According to one aspect of the present disclosure, an optical transceiver includes a housing, a heat dissipation module and an optical communication module. The heat dissipation module includes a first heat conductive component and a second heat conductive component accommodated in the housing. The first heat conductive component and the second heat conductive component are two independent components, and the first heat conductive component thermally contacts the second heat conductive component. The optical communication module is accommodated in the housing and thermally contacts the heat dissipation module.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
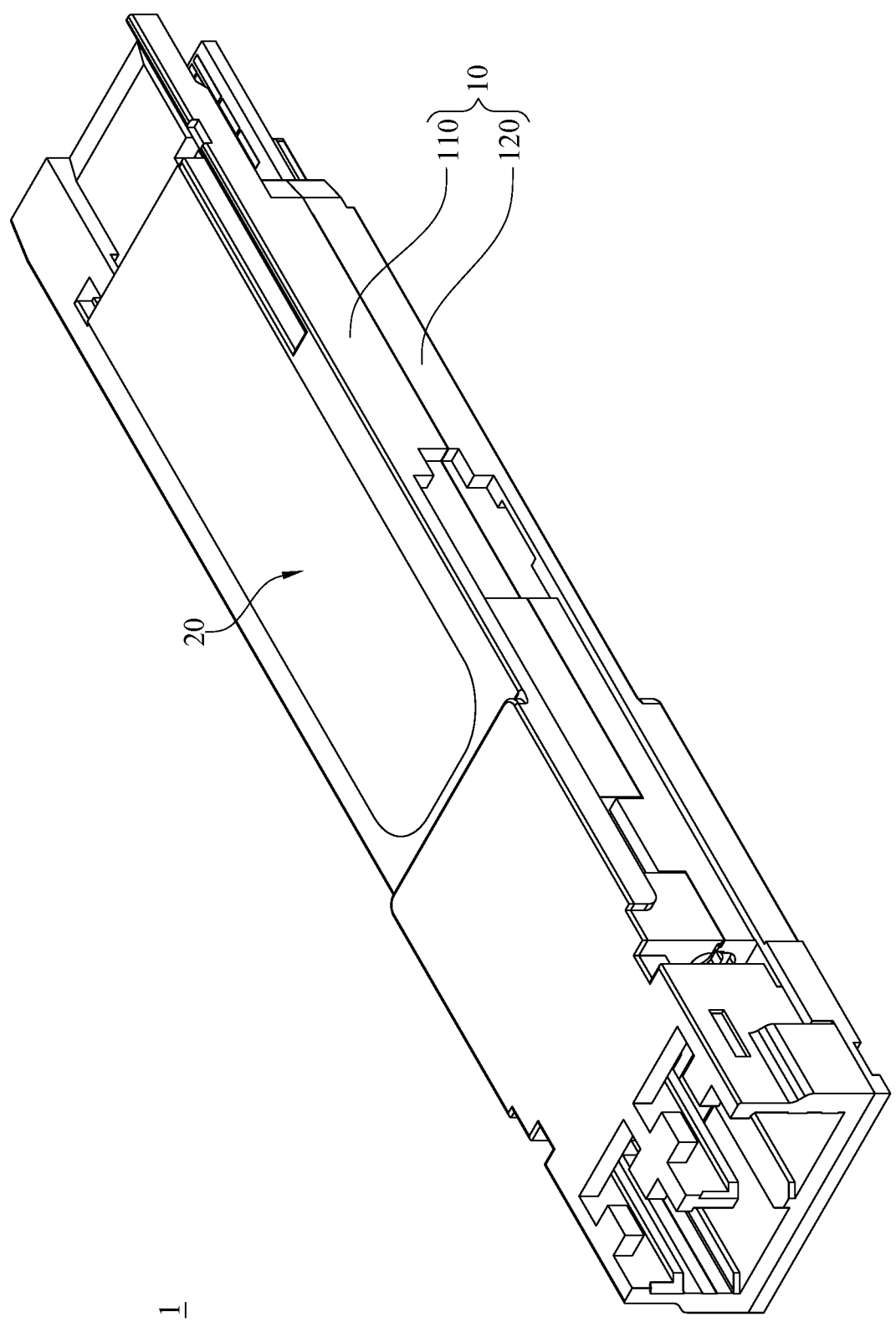
FIG. 1 is a perspective view of an optical transceiver according to one embodiment of the present disclosure.
Figure 2:
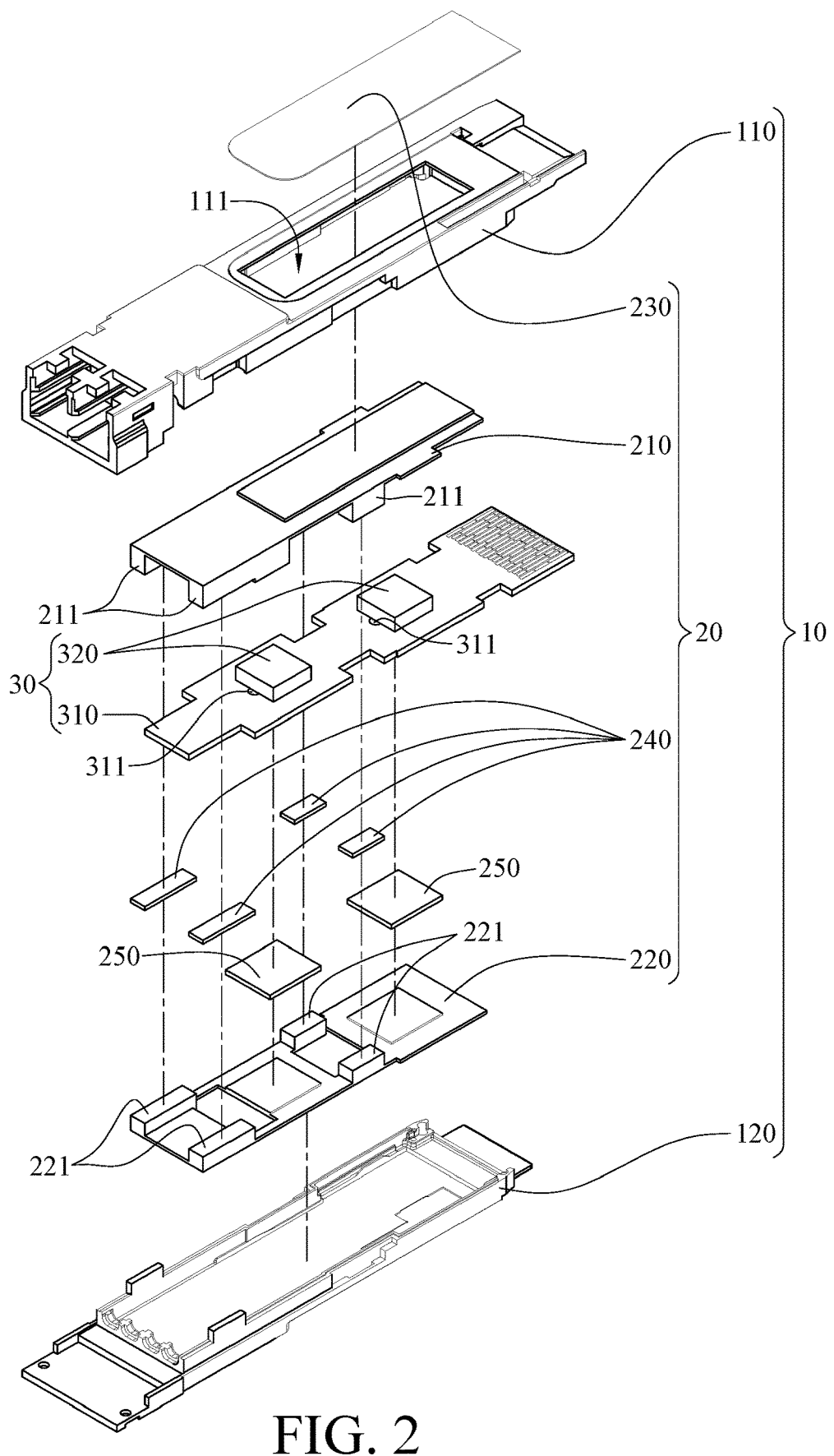
FIG. 2 is an exploded view of the optical transceiver in FIG. 1.
Figure 3:
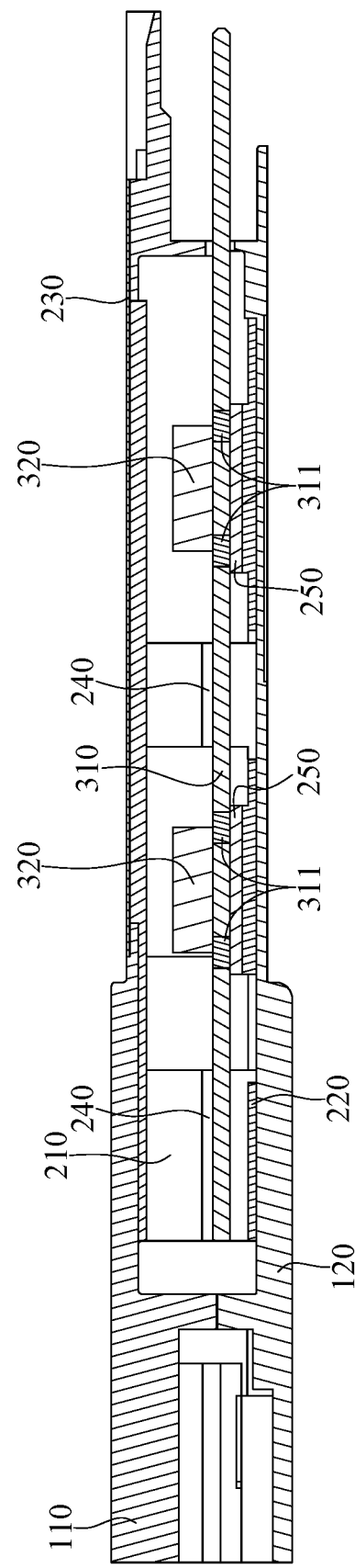
FIG. 3 is a cross-sectional view of the optical transceiver in FIG. 1.

Please refer to FIG. 1 through FIG. 3. FIG. 1 is a perspective view of an optical transceiver according to one embodiment of the present disclosure. FIG. 2 is an exploded view of the optical transceiver in FIG. 1. FIG. 3 is a cross-sectional view of the optical transceiver in FIG. 1. In this embodiment, an optical transceiver 1 may include a housing 10, a heat dissipation module 20 and an optical communication module 30.

The housing 10 includes an upper cover 110 and a lower cover 120 which are assembled together. The housing 10 may be configured to be inserted into a cage in pluggable manner for optical communication. In some cases, top of the heat dissipation module 20 might be horizontally aligned with the top of the upper cover 110.

The heat dissipation module 20 includes a first heat conductive component 210 and a second heat conductive component 220 accommodated in the housing 10. The first heat conductive component 210 and the second heat conductive component 220 are two independent components, and the first heat conductive component 210 thermally contacts the second heat conductive component 220. In detail, each of the first heat conductive component 210 and the second heat conductive component 220 are made of metal material and may be manufactured by having stamped or punched a metal sheet, such as copper sheet, aluminum sheet, nickel sheet and alloys thereof. The first heat conductive component 210 is located between the second heat conductive component 220 and part of the upper cover 110. The second heat conductive component 220 is located between the first heat conductive component 210 and part of the lower cover 120, and the second heat conductive component 220 thermally contacts the lower cover 120.

In this embodiment, each of the first heat conductive component 210 and the second heat conductive component 220 includes one or more protrusions. As shown in FIG. 2 and FIG. 3, a protrusion 211 of the first heat conductive component 210 extends toward the lower cover 120 of the housing 10, and a protrusion 221 of the second heat conductive component 220 extends toward the upper cover 110 of the housing 10. In short, the protrusions 211 and 221 in this embodiment extend toward each other and in opposite directions. The protrusion 211 of the first heat conductive component 210 thermally contacts the protrusion 221 of the second heat conductive component 220.

In this embodiment, the heat dissipation module 20 may include an auxiliary dissipation component 230 and one or more thermal conductive pads 240. More specifically, the auxiliary dissipation component 230, for example, is a metal plate disposed in an opening 111 of the upper cover 110 of the housing 10. The opening 111 of the upper cover 110 is connected with the chamber inside the housing 10 where the first heat conductive component 210 is located. The first heat conductive component 210 thermally contacts the auxiliary dissipation component 230. The thermal conductive pad 240, for example, is a graphite sheet or a thermal paste squeezed between the protrusion 211 of the first heat conductive component 210 and the protrusion 221 of the second heat conductive component 220.

The optical communication module 30, for example, is a TOSA or a ROSA accommodated in the housing 10. The optical communication module 30 includes a circuit board 310 and one or more optical communication components 320 disposed on the circuit board 310. The circuit board 310 is located between the first heat conductive component 210 and the second heat conductive component 220 of the heat dissipation module 20. The circuit board 310 thermally contacts the first heat conductive component 210 and the second heat conductive component 220. The optical communication component 320, for example, is a laser diode, a photodiode, an optical lens or a signal processor such as a digital signal processor (DSP).

In this embodiment, the circuit board 310 of the optical communication module 30 may include one or more thermal vias 311. The optical communication component 320 thermally contacts the thermal via 311, and the thermal via 311 thermally contacts the first heat conductive component 210 and the second heat conductive component 220 of the heat dissipation module 20. The thermal via 311, for example, is a metal bar filled in a drilled through hole of the circuit board 310 or a metal film coated on the inner wall of said drilled through hole.

Also, in this embodiment, the heat dissipation module 20 may include one or more thermal conductive pads 250 located below the circuit board 310 of the optical communication module 30. The thermal conductive pad 250 is squeezed between the circuit board 310 and the second heat conductive component 220 to enable or even enhance the thermal contact between the second heat conductive component 220 and thermal conductive pad 250, and the circuit board 310 directly contacts the first heat conductive component 210. In some other embodiments, the thermal conductive pad is squeezed between the circuit board 310 and the first heat conductive component 210 to enable or even enhance the thermal contact between the first heat conductive component 210 and thermal conductive pad, and the circuit board 310 directly contacts the second heat conductive component 220.

Figure 4:
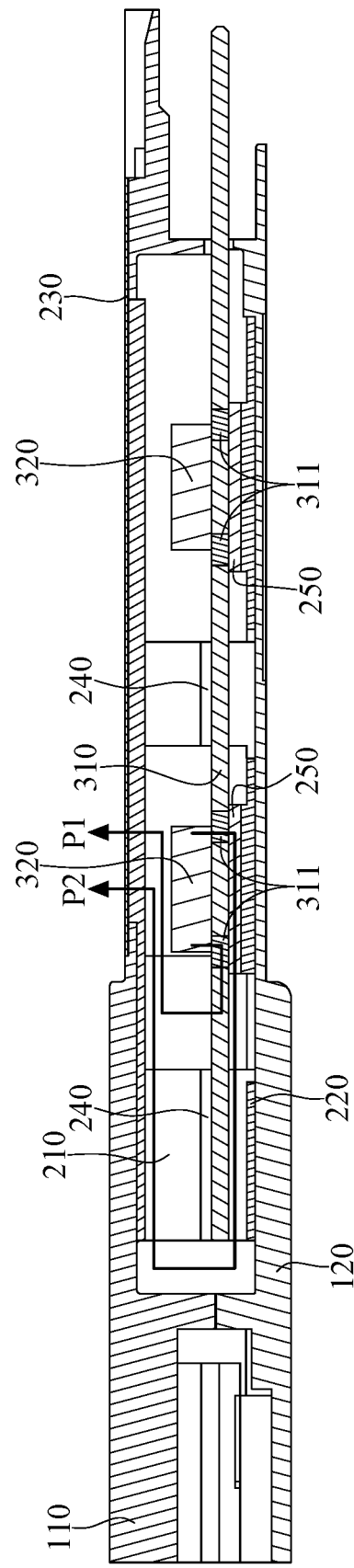
FIG. 4 is a schematic view showing heat transfer path of the optical transceiver in
FIG. 3.

FIG. 4 is a schematic view showing heat transfer paths of the optical transceiver in FIG. 3. In FIG. 4, the symbol P1 represents a heat transfer path from the optical communication component 320 to the upper cover 110 of the housing 10 and the auxiliary dissipation component 230. The symbol P2 represents another heat transfer path from the optical communication component 320 to the upper cover 110 of the housing 10.

The optical communication component 320 or any component adjacent to the optical communication component 320 when operating generates heat. Referring to the heat transfer path P1, such heat is transferred through the thermal via 311, the first heat conductive component 210, and the auxiliary dissipation component 230 to reach the upper cover 110. Referring to the heat transfer path P2, such heat is transferred through the thermal via 311, the second heat conductive component 220, the first heat conductive component 210, and the auxiliary dissipation component 230 to reach the upper cover 110.

The configuration of the heat dissipation module 20 is favorable for transferring heat, to the auxiliary dissipation component 230 and the upper cover 110 of the housing 10. The auxiliary dissipation component 230 may be of high thermal conductivity. In one implementation, the auxiliary dissipation component 230 may be of higher thermal conductivity than the first heat conductive component 210 and the second heat conductive component 220, so as to enhance heat dissipation efficiency. Moreover, the heat dissipation module 20 could help to evenly distribute heat to the housing 10 so as to prevent overly high temperature at any specific position of the optical transceiver 1. A heat sink may be provided to thermally contact the auxiliary dissipation component 230 or the upper cover 110 in order to further dissipate heat from the optical transceiver 1.

Figure 5:
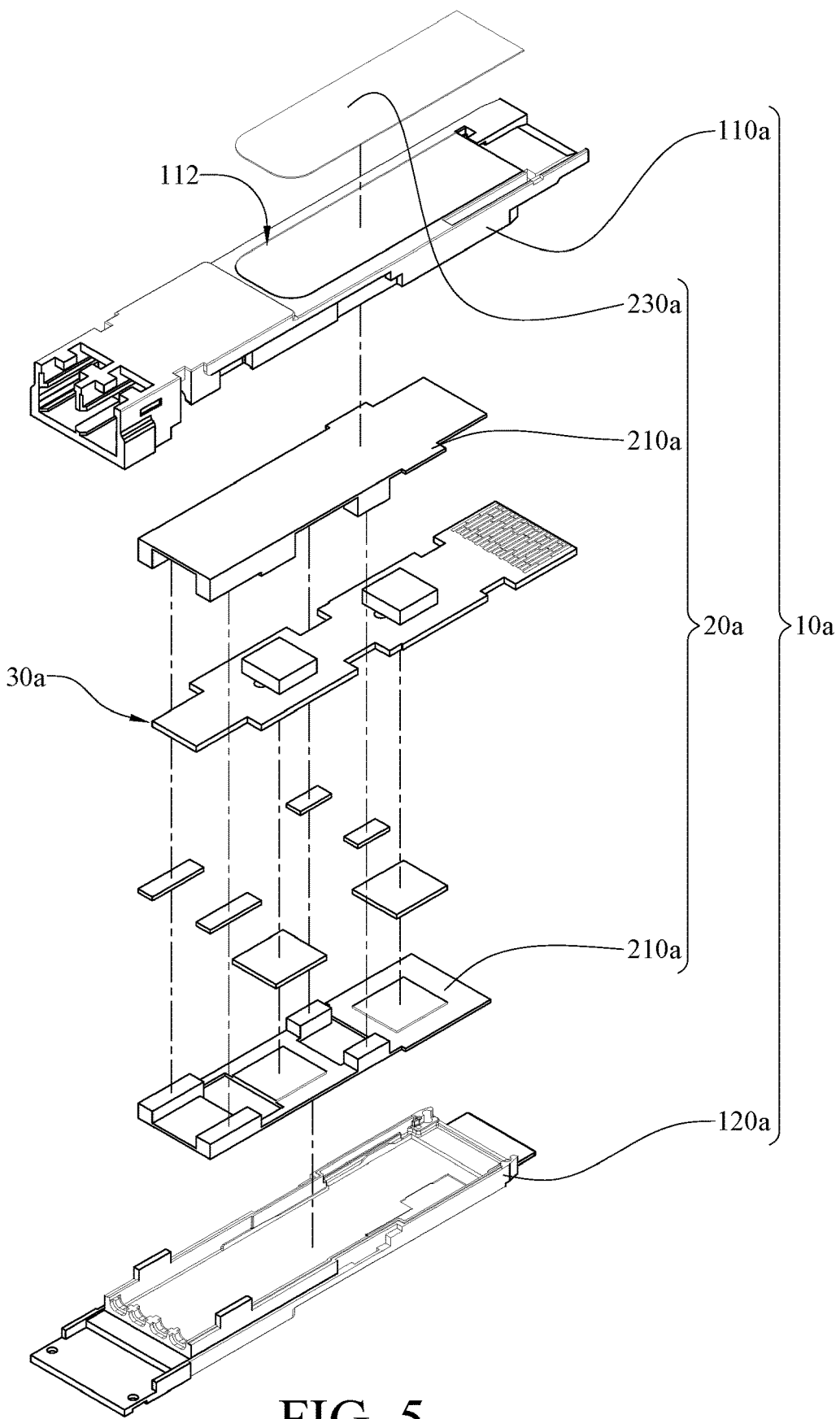
FIG. 5 is an exploded view of an optical transceiver according to another embodiment of the present disclosure.

The auxiliary dissipation component 230 is disposed in the opening 111 of the upper cover 110 of the housing 10 in FIG. 2, but the present disclosure is not limited thereto. FIG. 5 is an exploded view of an optical transceiver according to another embodiment of the present disclosure. In this embodiment, an optical transceiver 1a may include a housing 10a, a heat dissipation module 20a and an optical communication module 30a. The heat dissipation module 20a includes two heat conductive components accommodated 210a in the housing 10a and an auxiliary dissipation component 230a disposed on the housing 10a. In detail, the outer surface of an upper cover 110a of the housing 10a has a recess 112, and the auxiliary dissipation component 230a is disposed in the recess 112.

Figure 6:
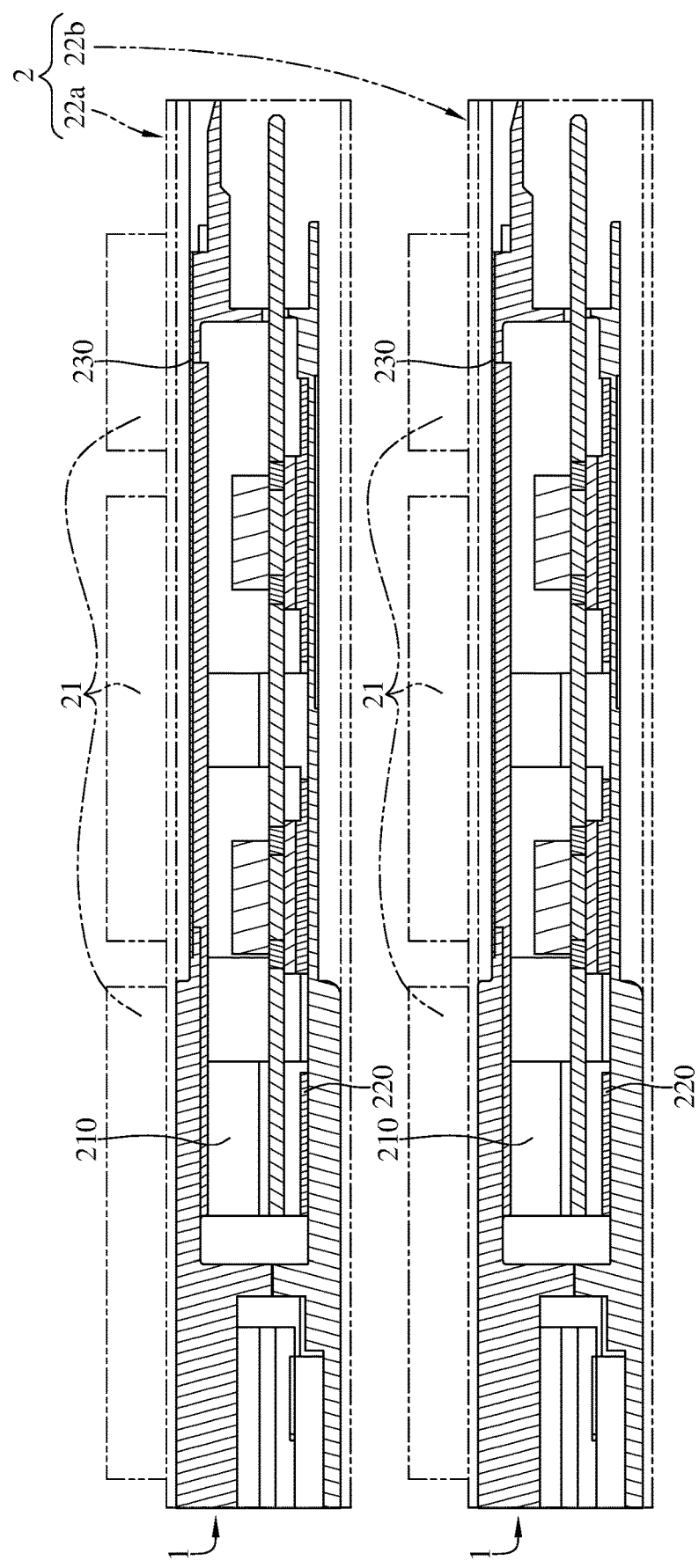
FIG. 6 is a schematic view showing multiple optical transceivers in FIG. 1 which are inserted into respective cages.

FIG. 6 is a schematic view showing multiple optical transceivers in FIG. 1 which are inserted into respective cages. Each of the optical transceivers 1 is inserted to a corresponding port/slot of a cage 2 with one located below another. The cage 2 includes multiple fins 21 extending from the top surface of the cage 2. The fins 21 are configured as a heat sink thermally contacting the auxiliary dissipation component 230 of the heat dissipation module 20.

Referring to FIG. 2 and FIG. 6, as to the upper optical transceiver 1 in FIG. 6, the two heat conductive components 210 and 220 could help transfer heat generated by the optical communication module 30 to the fins 21 of the upper slot 22a of the cage 2, such that the fins of the lower slot 22b of the cage 2 are prevented from receiving the heat generated in connection with the optical transceiver 1 located in the upper slot 22a of the cage 2, thereby improving heat dissipation when a device includes multiple optical transceivers 1.

According to the present disclosure, the heat dissipation module of the optical transceiver includes two heat conductive components accommodated in the housing and thermally contact each other. The optical communication module in the housing thermally contacts the heat dissipation module. The heat dissipation module could help evenly distributing the heat to the housing so as to prevent overly high temperature at any specific position of the optical transceiver.

Furthermore, referring to a device including multiple optical transceivers, the heat conductive components could help transfer the heat generated by the optical communication module in one optical transceiver to the fins of the slot of the cage where said one optical transceiver is inserted so as to prevent the fins of another slot of the cage where another optical transceiver is inserted from receiving the heat generated in said one optical transceiver.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical transceiver, comprising:
a housing;
a heat dissipation module comprising a first heat conductive component and a second heat conductive component accommodated in the housing, the first heat conductive component and the second heat conductive component being two independent components, and the first heat conductive component thermally contacting the second heat conductive component;
an optical communication module accommodated in the housing and thermally contacting the heat dissipation module; and
wherein a protrusion of the first heat conductive component extends toward a protrusion of the second heat conductive component, the protrusion of the second heat conductive component extends toward the protrusion of the first heat conductive component, and the protrusion of the first heat conductive component thermally contacts the protrusion of the second heat conductive component.

2. The optical transceiver according to claim 1, wherein the housing comprises an upper cover and a lower cover assembled together, the first heat conductive component is located between the second heat conductive component and part of the upper cover, the second heat conductive component is located between the first heat conductive component and part of the lower cover, and the second heat conductive component thermally contacts the lower cover.

3. The optical transceiver according to claim 2, wherein the heat dissipation module further comprises an auxiliary dissipation component disposed on the housing, and the first heat conductive component thermally contacts the auxiliary dissipation component.

4. The optical transceiver according to claim 3, wherein the auxiliary dissipation component is disposed in an opening of the upper cover of the housing.

5. The optical transceiver according to claim 3, wherein an outer surface of the upper cover has a recess, and the auxiliary dissipation component is disposed in the recess.

6. The optical transceiver according to claim 1, wherein the heat dissipation module further comprises a thermal conductive pad squeezed between the protrusion of the first heat conductive component and the protrusion of the second heat conductive component.

7. The optical transceiver according to claim 1, wherein the optical communication module comprises a circuit board and an optical communication component disposed on the circuit board, and the circuit board thermally contacts the first heat conductive component and the second heat conductive component of the heat dissipation module.

8. The optical transceiver according to claim 7, wherein the circuit board comprises a thermal via, the optical communication component thermally contacts the thermal via, and the thermal via thermally contacts the first heat conductive component and the second heat conductive component of the heat dissipation module.

9. The optical transceiver according to claim 1, wherein each of the first heat conductive component and the second heat conductive component is made of a material selected from the group consisting of copper, aluminum, nickel and alloys thereof.

* * * * *